US010846580B2

(12) United States Patent
Shinohara

(10) Patent No.: US 10,846,580 B2
(45) Date of Patent: Nov. 24, 2020

(54) IC CHIP SUPPORT TERMINAL, IC CHIP SETTING METHOD, AND PROGRAM

(71) Applicant: Rakuten, Inc., Tokyo (JP)

(72) Inventor: Hiroshi Shinohara, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 16/343,777

(22) PCT Filed: Oct. 27, 2016

(86) PCT No.: PCT/JP2016/081926
§ 371 (c)(1),
(2) Date: Apr. 22, 2019

(87) PCT Pub. No.: WO2018/078774
PCT Pub. Date: May 3, 2018

(65) Prior Publication Data
US 2019/0251410 A1 Aug. 15, 2019

(51) Int. Cl.
*G06K 19/06* (2006.01)
*G06K 7/08* (2006.01)
(Continued)

(52) U.S. Cl.
CPC ............. *G06K 19/07* (2013.01); *G06F 9/445* (2013.01); *G06F 21/445* (2013.01)

(58) Field of Classification Search
USPC ........................................ 235/380, 451, 492
See application file for complete search history.

(56) References Cited

U.S. PATENT DOCUMENTS 6,687,814 B1 * 2/2004 Duppong ............ G06F 13/4068
710/8
6,941,435 B2 * 9/2005 Bonaccio ............ G06F 15/7867
711/154
(Continued)

FOREIGN PATENT DOCUMENTS

EP     1755063 A2    2/2007
EP     2464085 A1    6/2012
(Continued)

OTHER PUBLICATIONS

English translation of the International Search Report for PCT/JP2016/081926 dated Jan. 17, 2017.
(Continued)

*Primary Examiner* — Tuyen K Vo
(74) *Attorney, Agent, or Firm* — HEA Law PLLC

(57) ABSTRACT

To enhance reliability to enable use of all of a plurality of IC-chip-based applications, transmission means of an IC chip support terminal transmits, to an IC chip management server, a registration request for each of a plurality of memory areas respectively corresponding to a plurality of IC-chip-based applications for using an IC chip which is enabled to perform wireless communication. Reception means receives registration instructions for the respective memory areas, each of which is transmitted by the IC chip management server in response to the registration request. Registration means executes processes for registering the respective memory areas in the IC chip successively or in parallel based on the registration instructions. Initial setting means performs an initial setting on each of the registered memory areas when all the plurality of memory areas have been registered in the IC chip.

10 Claims, 12 Drawing Sheets

(51) Int. Cl.
*G06K 19/07* (2006.01)
*G06F 21/44* (2013.01)
*G06F 9/445* (2018.01)

(56) References Cited

U.S. PATENT DOCUMENTS

| | | | | |
|---|---|---|---|---|
| 8,210,427 | B2* | 7/2012 | Noda | G06K 7/0008 |
| | | | | 235/382 |
| 8,544,735 | B2* | 10/2013 | Mestre | G06Q 20/3255 |
| | | | | 235/380 |
| 2002/0059556 | A1* | 5/2002 | Brawn | G06F 9/4411 |
| | | | | 713/2 |
| 2006/0213991 | A1* | 9/2006 | Koizumi | G06Q 20/357 |
| | | | | 235/451 |
| 2007/0038864 | A1 | 2/2007 | Takemura et al. | |
| 2008/0283595 | A1* | 11/2008 | Kimura | G06F 21/62 |
| | | | | 235/380 |
| 2009/0154244 | A1* | 6/2009 | Shiga | G11C 29/02 |
| | | | | 365/185.11 |
| 2012/0298747 | A1* | 11/2012 | Mestre | G06Q 20/3229 |
| | | | | 235/380 |

FOREIGN PATENT DOCUMENTS

| | | |
|---|---|---|
| JP | 2007-018341 A | 1/2007 |
| JP | 2007-052492 A | 3/2007 |
| JP | 2015-129994 A | 7/2015 |
| WO | 2008/146840 A1 | 12/2008 |

OTHER PUBLICATIONS

Search Report dated Jun. 16, 2020, for corresponding EP Patent Application No. 16919989.0.

Rahul Rajat Singh: "Understanding Retry Pattern With Exponential Back-Off and Circuit Breaker Pattern—DZone Integration", Oct. 10, 2016 (Oct. 10, 2016), XP055698898, Retrieved from the Internet: URL:https://dzone.com/articles/understanding-retry-pattern-with-exponential-back [retrieved on May 27, 2020] * p. 1, paragraph 1-p. 2, paragraph 3.

Anonymous: "Please, try again . . . (Retry Pattern in Node)—Zanon", Apr. 9, 2016 (Apr. 9, 2016), XP055698905, Retrieved from the Internet: URL:https://zanon.io/posts/please-try-again-retry-pattern-in-node [retrieved on May 27, 2020] * the whole document*.

Vitaly Baum: "Practical Microservices: Retry, Circuit Breaker and Compensation Transaction", Feb. 21, 2016 (Feb. 21, 2016), XP055698907, Retrieved from the Internet: URL:https://medium.com/@butaji/practical-microservices-retry-circuit-breaker-and-compensation-transaction-3013943db0e1 [retrieved on May 27, 2020] * the whole document*.

* cited by examiner

IC CHIP SUPPORT TERMINAL, IC CHIP SETTING METHOD, AND PROGRAM

CROSS REFERENCE TO RELATED APPLICATIONS

This application is a National Stage of International Application No. PCT/JP2016/081926 filed on Oct. 27, 2016. The contents of the above document is incorporated herein by reference in its entirety.

TECHNICAL FIELD

The present invention relates to an IC chip support terminal, an IC chip setting method, and a program.

BACKGROUND ART

Hitherto, there is known an IC chip support terminal configured to execute an IC-chip-based application for using an IC chip enabled to perform wireless communication. For example, in Patent Literature 1, there is described a system for transmitting, in order to execute a payment process based on electronic money, a registration request for a memory area for storing data on the electronic money to a server of a business entity that issues an IC chip, and registering a memory area dedicated to the electronic money in the IC chip in accordance with an instruction from the server. In such a system, initial setting is executed by writing data relating to the electronic money (for example, an encryption key and balance information) to the registered memory area.

CITATION LIST

Patent Literature

[PTL 1] JP 2007-052492 A

SUMMARY OF INVENTION

Technical Problem

In such a technology as described above, a plurality of IC-chip-based applications may be installed in an IC chip support terminal. For example, by enabling simultaneous use of an IC-chip-based application A relating to electronic money and an IC-chip-based application B relating to a coupon or a point, it is possible to enable the IC-chip-based application A and the IC-chip-based application B to cooperate with each other. That is, it is conceivable to issue a coupon or a point for an electronic money settlement of a product and perform an electronic money settlement while using a coupon or a point. In order to enable the use of those plurality of IC-chip-based applications, it is required to register a memory area dedicated to each of the plurality of IC-chip-based applications in an IC chip.

In this respect, according to the related-art technology, registration and initial setting of a memory area are executed on an IC chip as a series of processes, and hence, for example, the registration and initialization of the memory area for the IC-chip-based application B are started after the registration and initialization of the memory area for the IC-chip-based application A have been finished.

However, the IC chip support terminal executes those processes while communicating to/from a server, and hence processing may be stopped (shut down) at some midpoint before the registration of the memory area for the IC-chip-based application B is completed due to, for example, a communication failure. In this case, when a user installs another IC-chip-based application C and registers a memory area therefor without noticing that the memory area for the IC-chip-based application B has not been registered yet, the user may fail to register the memory area for the IC-chip-based application B due to an insufficient memory capacity of the IC chip. In this case, only the IC-chip-based application A can be used, and hence, it is not possible to enable, for example, the IC-chip-based applications A and B to cooperate with each other. Therefore, it is demanded that the use of all the plurality of IC-chip-based applications be reliably enabled.

The present invention has been made in view of the above-mentioned problem, and has an object to enhance reliability to enable use of all the plurality of IC-chip-based applications.

Solution to Problem

In order to solve the problem described above, an IC chip support terminal according to one embodiment of the present invention includes: transmission means for transmitting, to an IC chip management server, a registration request for each of a plurality of memory areas respectively corresponding to a plurality of IC-chip-based applications for using an IC chip which is enabled to perform wireless communication; reception means for receiving registration instructions for the respective memory areas, each of which is transmitted by the IC chip management server in response to the registration request; registration means for executing processes for registering the respective memory areas in the IC chip successively or in parallel based on the registration instructions; and initial setting means for performing an initial setting on each of the registered memory areas when all the plurality of memory areas have been registered in the IC chip.

An IC chip setting method according to one embodiment of the present invention includes: a transmission step of transmitting, to an IC chip management server, a registration request for each of a plurality of memory areas respectively corresponding to a plurality of IC-chip-based applications for using an IC chip which is enabled to perform wireless communication; a reception step of receiving registration instructions for the respective memory areas, each of which is transmitted by the IC chip management server in response to the registration request; a registration step of executing processes for registering the respective memory areas in the IC chip successively or in parallel based on the registration instructions; and an initial setting step of performing an initial setting on each of the registered memory areas when all the plurality of memory areas have been registered in the IC chip.

A program according to one embodiment of the present invention causes a computer to function as: transmission means for transmitting, to an IC chip management server, a registration request for each of a plurality of memory areas respectively corresponding to a plurality of IC-chip-based applications for using an IC chip which is enabled to perform wireless communication; reception means for receiving registration instructions for the respective memory areas, each of which is transmitted by the IC chip management server in response to the registration request; registration means for executing processes for registering the respective memory areas in the IC chip successively or in parallel based on the registration instructions; and initial setting means for performing an initial setting on each of the registered memory areas when all the plurality of memory areas have been registered in the IC chip.

Further, an information storage medium according to one embodiment of the present invention is a computer-readable information storage medium having the above-mentioned program stored thereon.

Further, in one aspect of the present invention, the transmission means is configured to transmit the registration requests for the respective memory areas to the IC chip management server successively or at a time, the reception means is configured to receive the registration instructions for the respective memory areas successively or at a time, the registration instructions being transmitted from the IC chip management server successively or at a time, and the registration means is configured to execute processes for registering the respective memory areas in the IC chip successively or in parallel based on the registration instructions received successively or at a time.

Further, in one aspect of the present invention, the IC chip support terminal further includes: means for establishing communication to/from the IC chip management server; and means for maintaining established communication after the transmission means starts to transmit the registration request for any one of the memory areas until the reception means has finished receiving the registration instructions for all the plurality of memory areas.

Further, in one aspect of the present invention, the initial setting means is configured to perform the initial setting based on content of communication to/from the management server or a common server common to the respective IC-chip-based applications, and the IC chip support terminal further includes: means for establishing communication to/from the common server or the management server; and means for maintaining established communication after a process for the initial setting for any one of the IC-chip-based applications is started until the initial setting for all the plurality of IC-chip-based applications has been finished.

Further, in one aspect of the present invention, the IC chip support terminal further includes: execution status acquisition means for acquiring an execution status of processing of the registration means and an execution status of processing of the initial setting means; and restart means for causing, when the processing of the registration means or the initial setting means has not been completed, the processing to be restarted based on the execution status acquired by the execution status acquisition means.

Further, in one aspect of the present invention, the IC chip support terminal further includes: determination means for determining, when the processing of the registration means has not been completed, whether registration of a memory area that is yet to be registered is possible based on an unused capacity of the IC chip; and restart method acquisition means for acquiring a restart method selected by a user when the determination means determines that the registration is impossible, and the restart means is configured to cause the processing to be restarted based on the restart method selected by the user.

Further, in one aspect of the present invention, the IC chip support terminal further includes the determination means for determining, when the processing of the registration means has not been completed, whether the registration of the memory area that is yet to be registered is possible based on the unused capacity of the IC chip, and the restart means is configured to: release a registered memory area without restarting the processing of the registration means when the determination means determines that the registration is impossible; and cause the processing of the registration means to be restarted when the determination means determines that the registration is possible.

Further, in one aspect of the present invention, the restart means is configured to cause the processing to be restarted from the processing of the initial setting means when the processing of the initial setting means is not started after the processing of the registration means has been completed.

Further, in one aspect of the present invention, the restart means is configured to cause the processing to be restarted from processing of the initial setting means that is stopped at some midpoint when the processing of the initial setting means is stopped at some midpoint.

Advantageous Effects of Invention

According to the embodiments of the present invention, it is possible to enhance reliability to enable use of all the plurality of IC-chip-based applications.

DESCRIPTION OF EMBODIMENTS

1. First Embodiment

Now, a description is given of an example of an IC chip management system including an IC chip support terminal according to an embodiment of the present invention.

[1-1. Hardware Configuration of IC Chip Management System]

Figure 1:
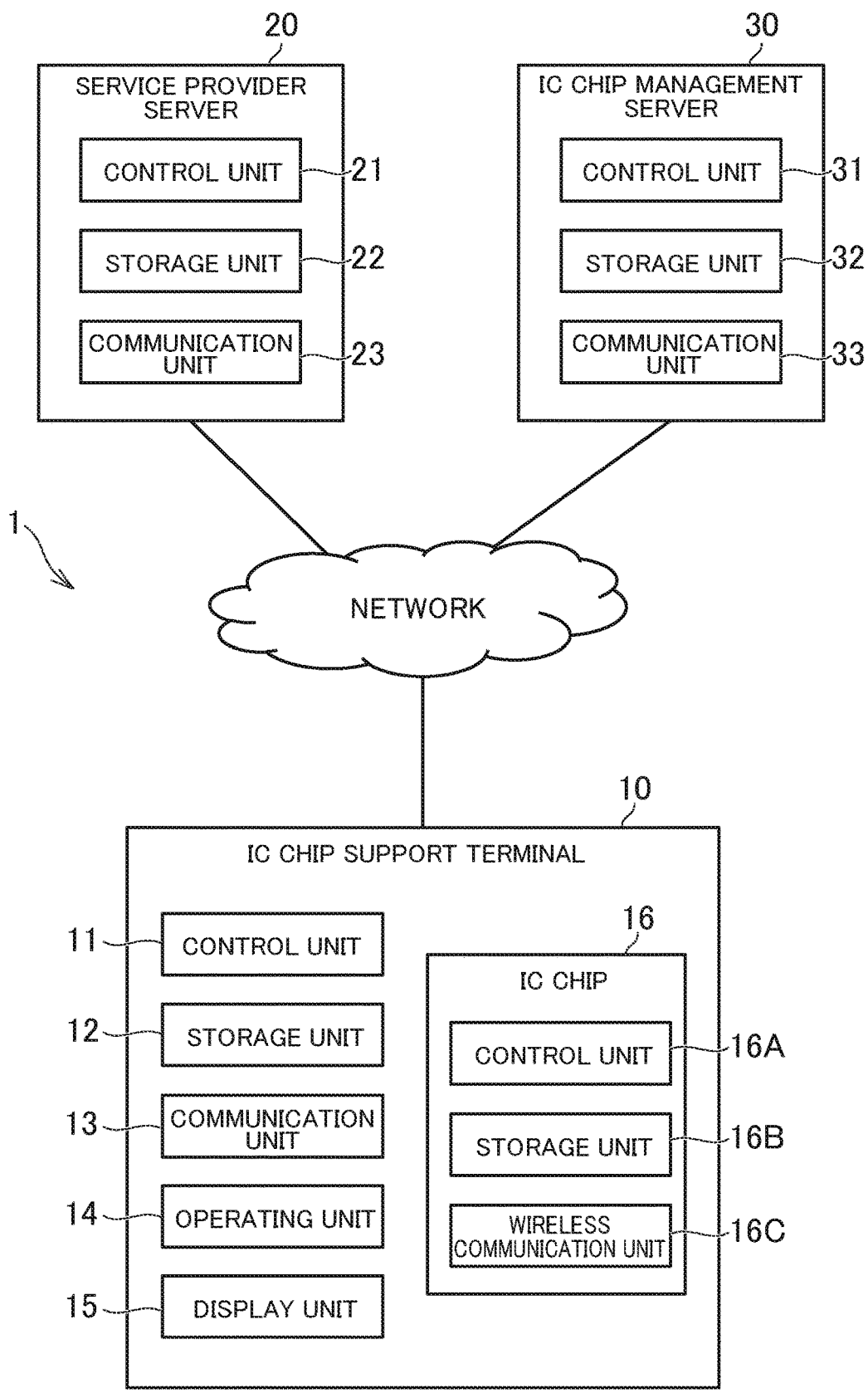
FIG. 1 is a diagram for illustrating a hardware configuration of an IC chip management system.

FIG. 1 is a diagram for illustrating a hardware configuration of an IC chip management system. As illustrated in FIG. 1, an IC chip management system 1 includes an IC chip support terminal 10, a service provider server 20, and an IC chip management server 30, which are connected to one another through the Internet or other such network so as to enable transmission and reception thereamong. In FIG. 1, one IC chip support terminal 10, one service provider server 20, and one IC chip management server 30 are illustrated, but there may be a plurality of IC chip support terminals 10, a plurality of service provider servers 20, and a plurality of IC chip management servers 30.

The IC chip support terminal 10 is a computer to be operated by a user, and examples thereof include a cell phone (including a smartphone), a portable information terminal (including a tablet computer), and a personal computer. The IC chip support terminal 10 includes a control unit 11, a storage unit 12, a communication unit 13, an operating unit 14, a display unit 15, and an IC chip 16. In this case, a case in which the IC chip 16 is built into the IC chip support terminal 10 is described, but the IC chip 16 may be provided outside the IC chip support terminal 10 and connected thereto in a wired or wireless manner.

The control unit 11 includes, for example, one or more microprocessors. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a ROM, an EEPROM, a flash memory, or a hard disk drive. The communication unit 13 is a communication interface for wired communication or wireless communication, and performs data communication via the network. The operating unit 14 is an input device to be used by the user for operation, and is, for example, a pointing device such as a touch panel and a mouse, a keyboard, or a button. The operating unit 14 transmits details of operation by the user to the control unit 11. The display unit 15 is, for example, a liquid crystal display unit or an organic EL display unit. The display unit 15 displays a screen in accordance with an instruction of the control unit 11.

The IC chip 16 is a semiconductor product called a so-called "secure element", and includes a control unit 16A, a storage unit 16B, and a wireless communication unit 16C. Physical configurations of the control unit 16A and the storage unit 16B may be the same as those of the control unit 11 and 12, respectively. In principle, data stored in the storage unit 16B is encrypted, and is capable of withstanding an external attack. For example, an encryption key is stored in the storage unit 16B. The control unit 16A executes an authentication process to/from an external device (for example, a reader/writer terminal), encryption/decryption of data, or other such process based on the encryption key. The wireless communication unit 16C is a communication interface capable of short-range wireless communication, and may include, for example, an antenna configured to receive an electromagnetic wave having a predetermined frequency emitted from the external device. For example, the wireless communication unit 16C performs communication by a communication scheme based on international standards.

In order to enable use of an IC-chip-based application, it is required to register a memory area corresponding to the IC-chip-based application in the storage unit 16B. That is, it is required to secure a memory area dedicated to the IC-chip-based application in the storage unit 16B. The IC-chip-based application is an application for providing the user with a service using the IC chip 16, and is an application for using the IC chip 16 for various purposes including, for example, an electronic settlement, an electronic ticket, a point-based system, a coupon-based system, an IC transit card, an air boarding pass, and an identification card.

Figure 2:
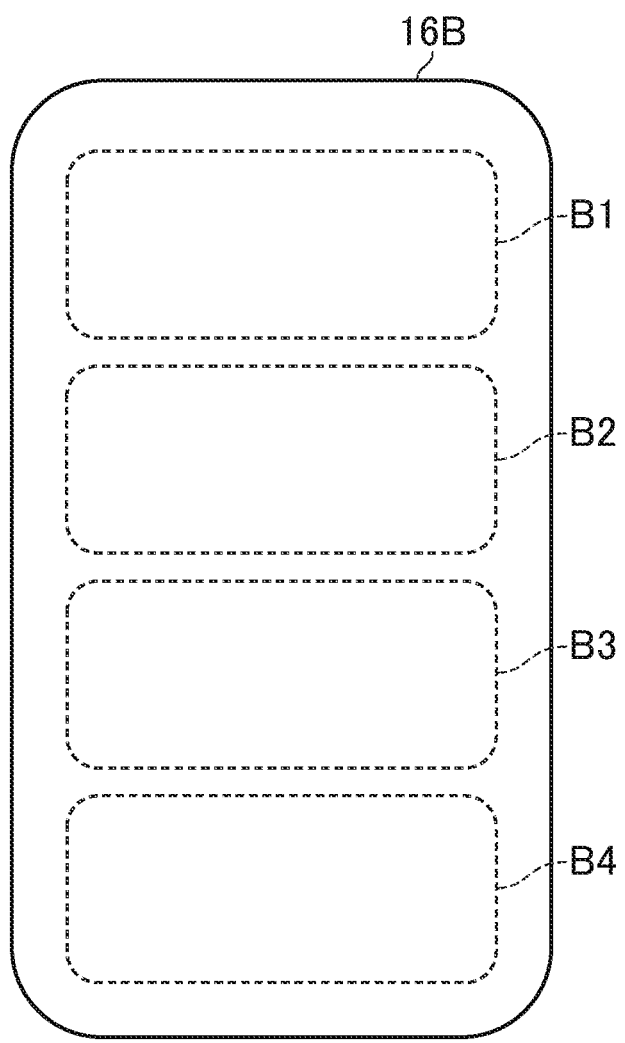
FIG. 2 is a diagram for illustrating an area in which data is to be stored in a storage unit.

FIG. 2 is a diagram for illustrating an area in which data is to be stored in the storage unit 16B. As illustrated in FIG. 2, in the first embodiment, the storage unit 16B is divided into a plurality of blocks B in advance. The block B is a unit of memory access to the IC chip 16. The first embodiment is described by taking a case in which the storage unit 16B includes four blocks B1 to B4, but the number of blocks B may be determined based on a memory size of the storage unit 16B, and may be any number. Data sizes of the respective blocks B may be equal to each other, or may be different from each other. The storage unit 16B also includes memory areas for management in which, for example, an encryption key, a program for reading and writing data, and other such data are stored, but those memory areas are omitted in FIG. 2.

As the memory area for each of the IC-chip-based applications, one or more blocks B are allocated. The required number of blocks may be common to all the IC-chip-based applications, or may differ depending on the IC-chip-based application. The memory area is what is called an "area", and corresponds to a folder or a directory in a general file system. In the memory area, it is possible to arrange a service being a logical accessor corresponding to a link or a shortcut for accessing a storage portion (so-called "user block") of real data. The service corresponds to a file in the general file system. The memory area can include an area, a service, and a user block.

The service provider server 20 is a server computer managed by a service provider. The service provider is a business entity that provides a service through use of the IC chip 16. The IC chip management server 30 includes a control unit 21, a storage unit 22, and a communication unit 23. Physical configurations of the control unit 21, the storage unit 22, and the communication unit 23 may be the same as those of the control unit 11, the storage unit 12, and the communication unit 13, respectively. In the first embodiment, the service provider server 20 distributes a plurality of IC-chip-based applications collectively as one program (this program is hereinafter referred to as "common application"). The respective IC-chip-based applications are not required to be combined into one common application, and may be provided as separate programs.

The IC chip management server 30 is a server computer managed by an IC chip provider. The IC chip provider is a business entity that provides the IC chip 16, and is what is called a "trusted service manager (TSM)". The IC chip provider may be the same business entity as the service provider, or may be a business entity different from the service provider. The IC chip management server 30 includes a control unit 31, a storage unit 32, and a communication unit 33. Physical configurations of the control unit 31, the storage unit 32, and the communication unit 33 may be the same as those of the control unit 11, the storage unit 12, and the communication unit 13, respectively.

The IC chip management server 30 centrally manages processing and data relating to all the IC chips 16 provided by the IC chip provider. Therefore, when data is read from or written to the IC chip 16, content thereof may be transmitted from the IC chip support terminal 10, a reader/writer terminal, or other such computer to the IC chip management server 30.

In the first embodiment, the service provider is assumed to have filed an application to the IC chip provider in advance, and has received approval for service content provided by the service provider itself, a data size (namely, the number of blocks) of a memory area to be used, data content to be written to the IC chip 16, and other such item. In addition, for example, the service provider is assumed to have filed an application to the IC chip provider for a procedure for a registration process for the memory area in advance, and has received approval for a procedure to be used for performing the registration process and data to be written in initial setting. Data indicating content of the registration process (hereinafter referred to as "remote issuing data") may be stored in the storage unit 32. For example, the remote issuing data is stored in the storage unit 32 for each of the IC-chip-based applications. Therefore, the registration process for the memory area for a given IC-chip-based application is executed in accordance with a processing procedure indicated by the remote issuing data on the given IC-chip-based application.

Programs and data to be described as being stored into the storage units 12, 16B, 22, and 32 may be supplied thereto via a network. Further, the respective hardware configurations of the computers are not limited to the above-mentioned examples, and various types of hardware can be applied thereto. For example, the hardware configuration may include a reading unit (for example, an optical disc drive or a memory card slot) configured to read a computer-readable information storage medium, or an input/output unit (for example, a USB port) configured to input and output data to/from an external device. For example, the program and the data stored in the information storage medium may be supplied to each of the computers through intermediation of the reading unit or the input/output unit.

In the IC chip management system 1 in the first embodiment, an IC-chip-based application relating to an electronic money settlement and an IC-chip-based application B relating to the use of points are assumed to be combined into a common application. When the common application is launched for the first time, the registration process for the memory area for the IC-chip-based application A and the registration process for the memory area for the IC-chip-based application B are executed successively or in parallel. This allows registration of a memory area to be completed in an early stage, and even when, for example, the initial setting is stopped at some midpoint, prevents an unused capacity of the IC chip 16 from becoming insufficient due to another IC-chip-based application. As a result, reliability to enable use of both the IC-chip-based applications A and B is enhanced. The following description is given of details of the above-mentioned technology.

[1-2. Functions Implemented in the Embodiment]

Figure 3:
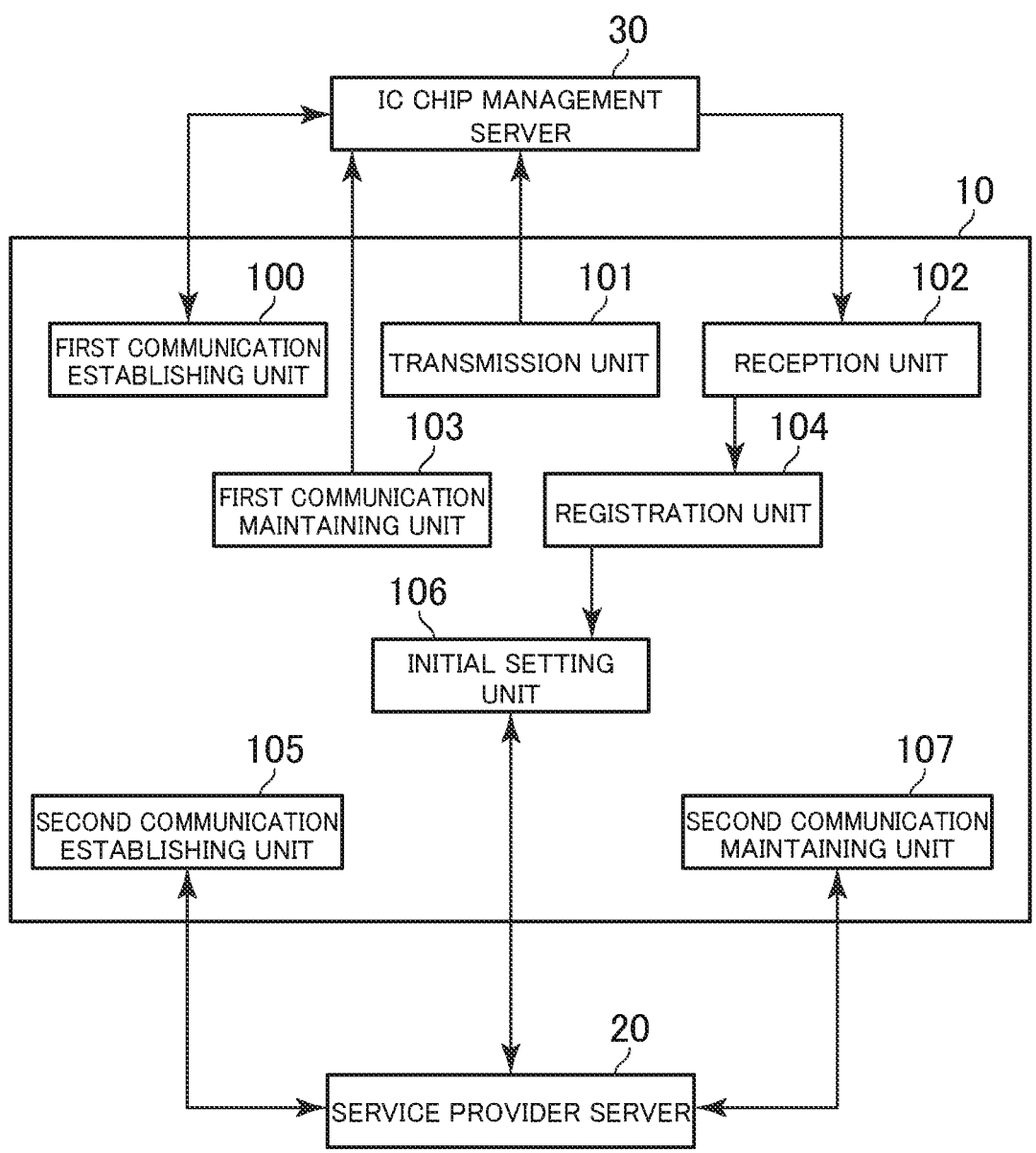
FIG. 3 is a functional block diagram for illustrating an example of functions implemented by the IC chip management system.

FIG. 3 is a functional block diagram for illustrating an example of functions implemented by the IC chip management system 1. Now, of the functions implemented by the IC chip management system 1, functions implemented by the IC chip support terminal 10 are described. As illustrated in FIG. 3, the first embodiment is described by taking a case in which a first communication establishing unit 100, a transmission unit 101, a reception unit 102, a first communication maintaining unit 103, a registration unit 104, a second communication establishing unit 105, an initial setting unit 106, and a second communication maintaining unit 107 are implemented by the IC chip support terminal 10.

[1-2-1. First Communication Establishing Unit]

The first communication establishing unit 100 is implemented mainly by the control unit 11 and the communication unit 13. The first communication establishing unit 100 establishes communication to/from the IC chip management server 30. For the communication between the IC chip support terminal 10 and the IC chip management server 30, any communication protocol can be employed, and, for example, a protocol of a server-client communication scheme defined by the IC chip provider may also be employed. The first communication establishing unit 100 may establish the communication through use of a Web plug-in for communicating to/from an external device through intermediation of a browser of the IC chip support terminal 10, or may establish the communication without particular intermediation of the browser.

The first communication establishing unit 100 establishes the communication between the IC chip support terminal 10 and the IC chip management server 30 based on a procedure defined by the communication protocol. For example, the first communication establishing unit 100 executes verification of version information of the communication and host authentication. Then, the first communication establishing unit 100 establishes the communication when the host authentication is successful, and generates a session ID (or a common key) for maintaining the communication (session). The session ID is authentication information that is valid only while the communication is established, and may be, for example, a random symbol string. The session ID may be exchanged with the IC chip management server 30 through use of, for example, a public key scheme.

The first embodiment is described by taking a case in which the communication between the IC chip support terminal 10 and the IC chip management server 30 is maintained until a predetermined condition is satisfied after the first communication establishing unit 100 establishes the communication, but the communication may be automatically disconnected when the transmission and reception of data to be transmitted and received are completed, or sessionless communication that does not maintain a connected state may be employed. While the established communication is maintained, validity of the IC chip support terminal 10 is proved through use of the session ID without the requirement to follow a communication start procedure between the IC chip support terminal 10 and the IC chip management server 30.

[1-2-2. Transmission Unit]

The transmission unit 101 is implemented mainly by the control unit 11 and the communication unit 13. The transmission unit 101 transmits, to the IC chip management server 30, a registration request for each of a plurality of memory areas respectively corresponding to the plurality of IC-chip-based applications using the IC chip 16 enabled to perform wireless communication. The registration request is only required to include information for identifying a request to start the registration process, and may be data having a predetermined format. In the first embodiment, the remote issuing data is registered in advance in the IC chip management server 30, and hence the registration request can be regarded as a request to start the registration process based on the remote issuing data. The registration request may include information for identifying the IC-chip-based application and information for identifying the service provider.

In the first embodiment, the transmission unit 101 transmits registration requests for the respective memory areas to the IC chip management server 30 successively or at a time. For example, storing a plurality of registration requests respectively corresponding to the plurality of IC-chip-based applications in separate frames on a one-to-one basis and transmitting the respective frames in order corresponds to transmitting the registration requests successively. Meanwhile, for example, storing a plurality of registration requests in one frame and transmitting the one frame corresponds to transmitting the registration requests at a time. In this case, the "frame" refers to a unit of data to be transmitted and received. For example, real data to be transmitted and received is stored in a portion sandwiched between a flag indicating the beginning of a frame and a flag indicating the end of the frame.

For example, when transmitting the registration requests successively, the transmission unit 101 transmits the respective registration requests in order one by one. For example, after transmitting the registration request for the IC-chip-based application A, the transmission unit 101 subsequently transmits the registration request for the IC-chip-based application B. In other words, the transmission unit 101 starts transmitting the registration request for the IC-chip-based application B in response to the completion of the transmission of the registration request for the IC-chip-based application A. The transmission order thereof may be reversed, and the transmission order of the registration requests for the respective IC-chip-based applications may be freely set.

Meanwhile, for example, when transmitting the registration requests at a time, the transmission unit 101 transmits the plurality of registration requests respectively corresponding to the plurality of IC-chip-based applications collectively at a time. For example, the transmission unit 101 stores the registration request for the IC-chip-based application A and the registration request for the IC-chip-based application B in one frame, and transmits the one frame. That is, the transmission unit 101 stores the respective registration requests for the plurality of IC-chip-based applications between the flag indicating the beginning of one given frame and the flag indicating the end, and transmits the frame.

Instead of transmitting the registration requests successively or at a time, the transmission unit 101 may transmit the registration request for the memory area for the IC-chip-based application A, and after a lapse of a fixed time period, transmit the registration request for the memory area for the IC-chip-based application B. In another case, for example, the transmission unit 101 may transmit the registration request for the memory area for the IC-chip-based application A, and before the registration of the memory area for the IC-chip-based application A is completed, transmit the registration request for the memory area for the IC-chip-based application B. Even with this configuration, it is possible to execute the registration process for the memory area for the IC-chip-based application B in an early stage to some extent.

[1-2-3. Reception Unit]

The reception unit 102 is implemented mainly by the control unit 11 and the communication unit 13. The reception unit 102 receives registration instructions for the respective memory areas, which are transmitted by the IC chip management server 30 in response to the registration requests. The registration instruction may include information for identifying the start of the registration process for the memory area, and may be data having a predetermined format.

When receiving a registration request for a given IC-chip-based application, the IC chip management server 30 transmits the registration instruction for the IC-chip-based application in response thereto. In the first embodiment, the remote issuing data is registered in the IC chip management server 30 in advance, and hence the IC chip management server 30 transmits the registration instruction based on the remote issuing data on the IC-chip-based application for which the registration request has been made. For example, when the required number of blocks is described in the remote issuing data, the IC chip management server 30 may transmit the registration instruction including information for identifying the number of blocks and a start command for the registration process.

In the first embodiment, the transmission unit 101 transmits the registration requests successively or at a time, and hence the IC chip management server 30 also transmits the registration instructions successively or at a time in response thereto. Therefore, the reception unit 102 receives successively or at a time the registration instructions for the respective memory areas, which are transmitted by the IC chip management server 30 successively or at a time. For example, storing a plurality of registration instructions respectively corresponding to the plurality of IC-chip-based applications in separate frames on a one-to-one basis and receiving the respective frames in order corresponds to receiving the registration instructions successively. Meanwhile, for example, storing a plurality of registration instructions in one frame and receiving the one frame corresponds to receiving the registration requests at a time.

For example, when receiving the registration requests successively, the reception unit 102 receives the plurality of registration instructions respectively corresponding to the plurality of IC-chip-based applications in order one by one. For example, after receiving the registration instruction for the memory area for the IC-chip-based application A, the reception unit 102 subsequently receives the registration instruction for the memory area for the IC-chip-based application B. In other words, the reception unit 102 starts receiving the registration instruction for the memory area for the IC-chip-based application B in response to the completion of the reception of the registration instruction for the memory area for the IC-chip-based application A. The reception order thereof may be reversed, and the reception order of the registration instructions for the respective IC-chip-based applications may be freely set.

Meanwhile, for example, when receiving the registration instructions at a time, the reception unit 102 receives the plurality of registration instructions respectively corresponding to the plurality of IC-chip-based applications collectively at a time. For example, when the IC chip management server 30 transmits the plurality of registration instructions after storing the registration instructions in one frame, the reception unit 102 receives one frame in which the registration instruction for the memory area for the IC-chip-based application A and the registration instruction for the memory area for the IC-chip-based application B are stored.

Instead of receiving the registration instructions successively or at a time, the reception unit 102 may receive the registration instruction for the IC-chip-based application A, and after a lapse of a fixed time period, receive the registration instruction for the IC-chip-based application B. In another case, for example, the reception unit 102 may receive the registration instruction for the IC-chip-based application A, and before the registration of the memory area for the IC-chip-based application A is completed, receive the registration instruction for the IC-chip-based application B. Even with this configuration, it is possible to execute the registration process for the memory area for the IC-chip-based application B in an early stage to some extent.

[1-2-4. First Communication Maintaining Unit]

The first communication maintaining unit 103 is implemented mainly by the control unit 11 and the communication unit 13. The first communication maintaining unit 103 maintains the established communication until the reception unit 102 has finished receiving all the registration instructions for the plurality of memory areas after the transmission unit 101 starts transmitting the registration request for any one of the memory areas. That is, the first communication maintaining unit 103 maintains a state of being connected to the IC chip management server 30 without disconnecting the communication established by the first communication establishing unit 100. For example, the established communication is terminated due to, for example, a timeout, but can also be terminated by calling a method for terminating the communication. Therefore, the first communication maintaining unit 103 may validate the generated session ID without calling the method until all the registration instructions have been received. The first communication maintaining unit 103 may be omitted.

[1-2-5. Registration Unit]

The registration unit 104 is implemented mainly by the control unit 16A. The registration unit 104 executes the registration processes for registering the respective memory areas in an IC chip successively or in parallel based on the registration instructions. For example, executing the subsequent registration process immediately after or within a predetermined time period after a given registration process is completed corresponds to executing the registration processes successively. Meanwhile, for example, executing another registration process during the execution of a given registration process corresponds to executing the registration processes in parallel.

The first embodiment is described by taking a case in which a registration process for a given IC-chip-based application is started based on the registration instruction immediately after the registration instruction is received. However, even when the registration instruction for the given IC-chip-based application is received, the registration unit 104 may stand by for the registration process to start until the registration instructions for all the IC-chip-based applications have been received. In this case, after having received the registration instructions for all the IC-chip-based applications, the registration unit 104 starts the registration processes for the respective IC-chip-based applications in order or simultaneously.

In the first embodiment, the information for identifying the required number of blocks and the command for instructing to start the registration process are included in the registration instruction, and hence the registration unit 104 executes the command included in the registration instruction to register a memory area having the required number of blocks, which is included in the registration instruction. For example, in the registration process, processing for associating a block forming a memory area with an IC-chip-based application may be executed, or processing for creating a conversion table between a physical address of a block and a logical address for operating an IC-chip-based application may be executed.

In the first embodiment, the registration unit 104 executes processes for registering the respective memory areas in the IC chip successively or in parallel based on the registration instructions received successively or at a time. For example, when the registration instructions are received successively, the registration unit 104 executes a registration process for an IC-chip-based application each time the registration unit 104 receives the registration instruction for the IC-chip-based application. Meanwhile, when the registration instructions are received at a time, the registration unit 104 executes the registration processes based on the respective registration instructions received at a time.

Figure 4:
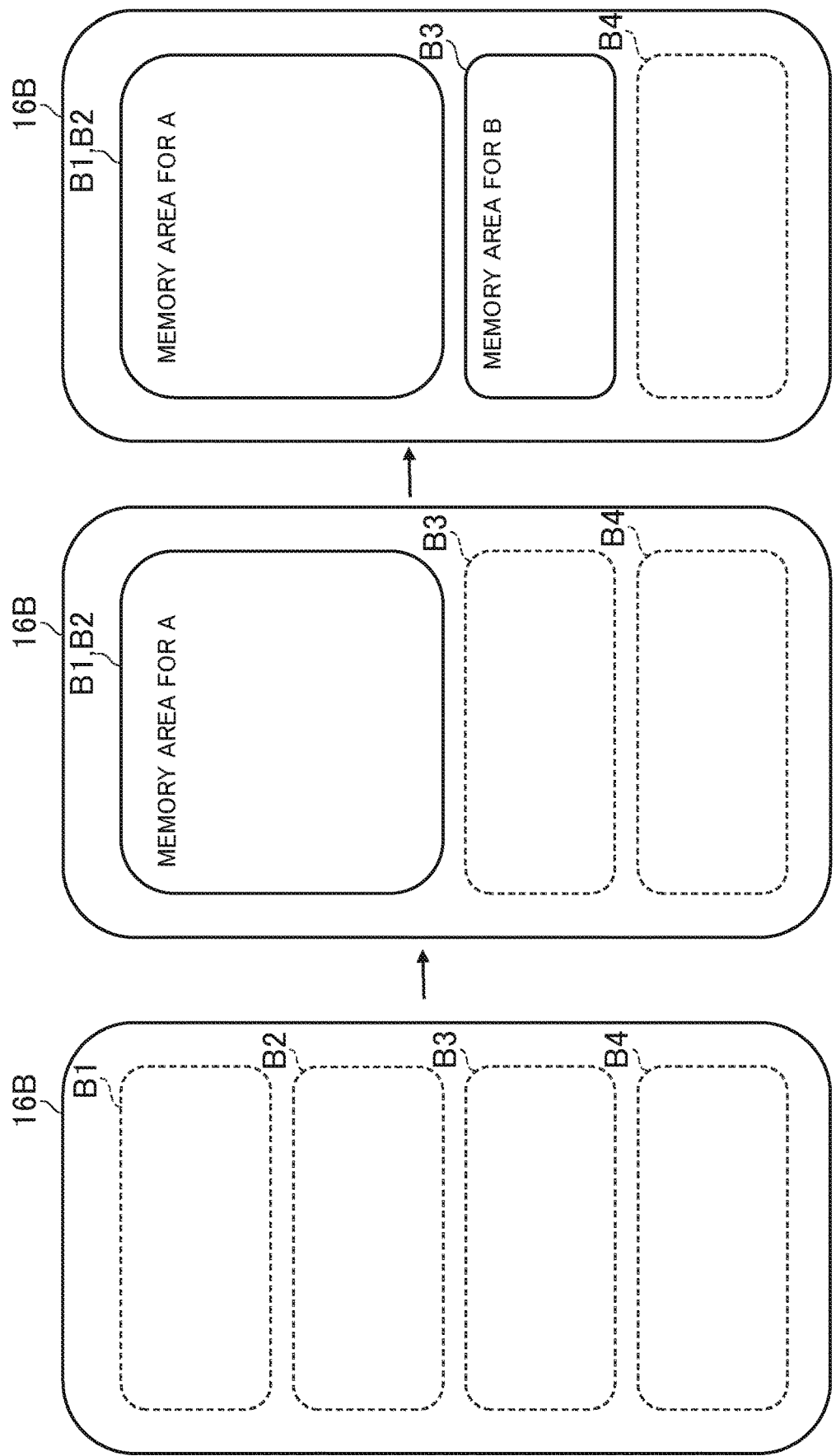
FIG. 4 is a diagram for illustrating how a memory area for an IC-chip-based application is registered.

FIG. 4 is a diagram for illustrating how the memory area for the IC-chip-based application is registered. Now, a case in which the IC-chip-based application A uses two blocks and the IC-chip-based application B uses one block is described. As illustrated in FIG. 4, for example, after completing the registration process for the memory area for the IC-chip-based application A (blocks B1 and B2 in FIG. 4), the registration unit 104 subsequently starts the registration process for the memory area for the IC-chip-based application B (block B3 in FIG. 4).

In other words, the registration unit 104 starts the registration process for the memory area for the IC-chip-based application B in response to the completion of the registration for the memory area for the IC-chip-based application A. The processing order thereof may be reversed, and the order of the registration processes for the respective IC-chip-based applications may be freely set.

Meanwhile, for example, the registration unit 104 may execute a plurality of registration processes respectively corresponding to the plurality of IC-chip-based applications collectively at a time. For example, the registration unit 104 may execute the registration process for the memory area for the IC-chip-based application A and the registration process for the memory area for the IC-chip-based application B simultaneously in parallel. In this case, start timings and end timings of those two registration processes are not required to match each other, and it suffices that a part of a period during which the registration process for the memory area for the IC-chip-based application A is being executed and a part of a period during which the registration process for the memory area for the IC-chip-based application B is being executed overlap with each other.

When the registration unit 104 executes the registration processes successively, it is not necessarily prohibited to create a gap between a timing at which a given registration process is completed and a timing at which the subsequent registration process is started, and the subsequent registration process may be subsequently started within a fixed time period after the given registration process is completed.

[1-2-6. Second Communication Establishing Unit]

The second communication establishing unit 105 is implemented mainly by the control unit 11 and the communication unit 13. The second communication establishing unit 105 establishes communication to/from the service provider server 20. Any communication protocol can be employed for the communication between the IC chip support terminal 10 and the service provider server 20. For example, the communication protocol may be HTTP, HTTPS, or SSH, or may be the same communication protocol as that of the first communication establishing unit 100. It suffices to establish the communication based on a procedure defined by the communication protocol in the same manner as in the case of the first communication establishing unit 100.

The first embodiment is described by taking a case in which the communication between the IC chip support terminal 10 and the service provider server 20 is maintained until a predetermined condition is satisfied after the second communication establishing unit 105 establishes the communication, but in the same manner as in the case of the first communication establishing unit 100, the communication may be automatically disconnected when the transmission and reception of the data are completed, or the sessionless communication may be employed. In addition, the validity of the IC chip support terminal 10 is proved through use of the session ID in the same manner as in the case of the first communication establishing unit 100.

[1-2-7. Initial Setting Unit]

The initial setting unit 106 is implemented mainly by the control unit 11 and a control unit 16A. When all the plurality of memory areas have been registered in the IC chip, the initial setting unit 106 performs initial setting on each of the registered memory areas. The initial setting is a setting process for enabling the IC-chip-based application to start to provide a service, and is regarded as a process for validating the memory area. For example, the initial setting may be a process for writing an initial value of data relating to the IC-chip-based application, information relating to the encryption key, and an ID assigned to the user, to the registered memory area.

The initial setting unit 106 may start the initial setting on each of the IC-chip-based applications after the memory areas for all the IC-chip-based applications have been registered, or even before the registration of the memory area for any one of the IC-chip-based applications has not been completed, may start the initial setting on the registered IC-chip-based application as long as the registration process for the IC-chip-based application has been started.

In the first embodiment, the initial setting unit 106 performs the initial setting based on content of the communication to/from the service provider server 20 common to the respective IC-chip-based applications. For example, the initial setting unit 106 receives data required for the initial setting from the service provider server 20, and executes the initial setting based on the received data. In addition, for example, the initial setting unit 106 may execute the initial setting based on a command received from the service provider server 20.

The service provider servers 20 corresponding to the respective IC-chip-based applications may be separate servers different from each other. In addition, the initial setting unit 106 may execute an initial setting process without communicating to/from the service provider server 20. For example, the initial setting unit 106 may perform the initial setting based on content of the communication to/from the IC chip management server 30. In this case, the IC chip management server 30 may generate data required for the initial setting, or the data may be stored in the remote issuing data in advance. The initial setting unit 106 may further execute the initial setting without communicating to/from a computer other than the IC chip support terminal 10. In this case, the initial setting unit 106 may itself generate the data required for the initial setting.

[1-2-8. Second Communication Maintaining Unit]

The second communication maintaining unit 107 maintains the established communication after a process for the initial setting for any one of the IC-chip-based applications is started until the initial setting for all the plurality of IC-chip-based applications has been finished. That is, the second communication maintaining unit 107 maintains communication established by the second communication establishing unit 105 without disconnecting the communication. In the same manner as in the first communication maintaining unit 103, for example, the communication established by the second communication establishing unit 105 is terminated due to, for example, a timeout, but can also be terminated immediately by calling a predetermined method. Therefore, the second communication maintaining unit 107 validates the generated session ID without calling the method until all the initial setting for all the IC-chip-based applications has been finished. The second communication maintaining unit 107 may be omitted.

[1-3. Processing to be Executed by Second Embodiment]

Figure 5:
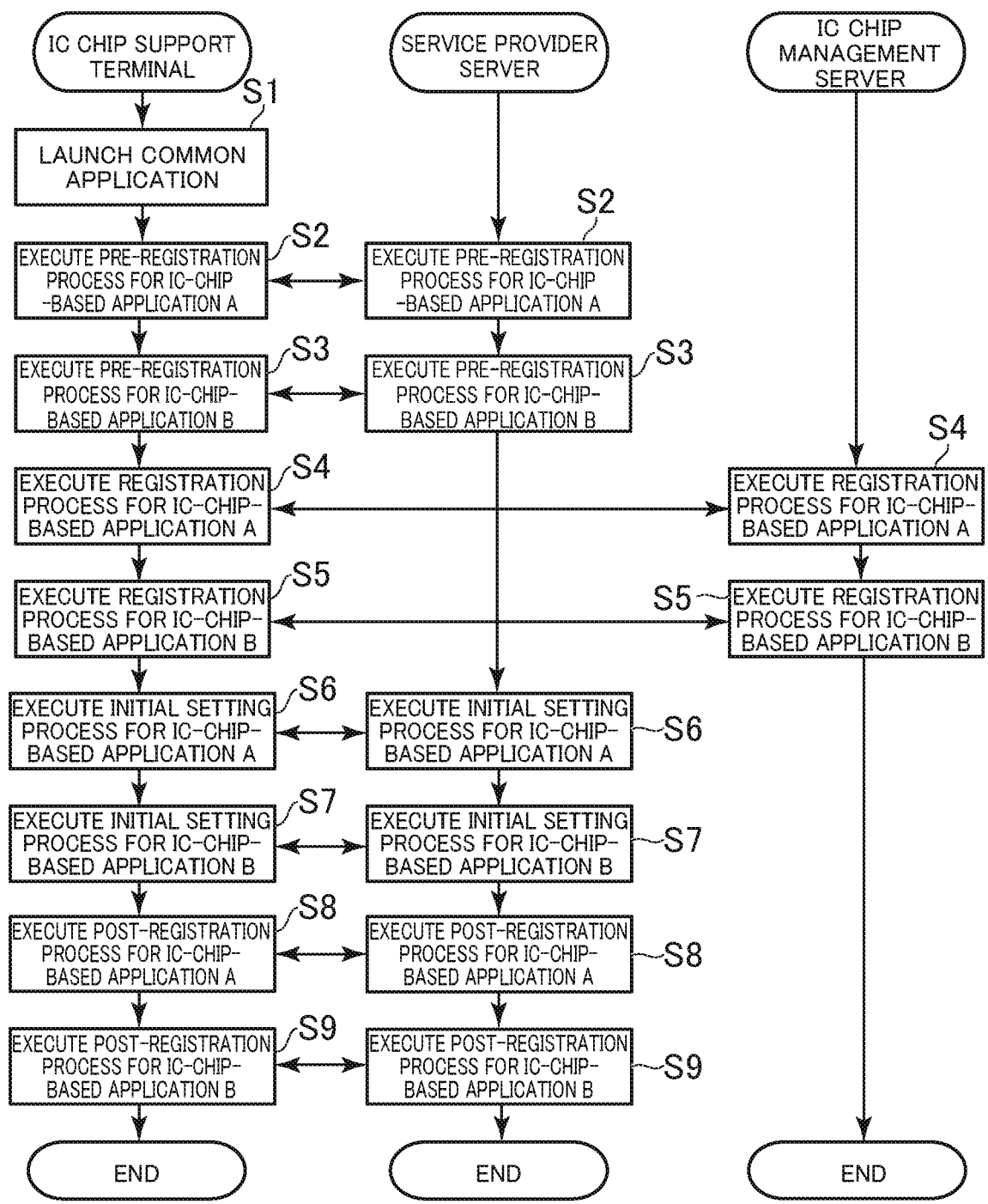
FIG. 5 is a flow chart for illustrating an example of processing executed by the IC chip management system.

FIG. 5 is a flow chart for illustrating an example of processing executed by the IC chip management system 1. The processing illustrated in FIG. 5 is executed by the control units 11, 21, and 31 operating in accordance with programs stored in the storage units 12, 22, and 32, respectively. Of processes described below, processes of the IC chip support terminal 10 are examples of processes executed by the functional blocks illustrated in FIG. 3. It is assumed that, before the processes illustrated in FIG. 5 are executed, the common application is downloaded from the service provider server 20 onto the IC chip support terminal 10 to be stored in the storage unit 12 in advance. It is also assumed that the Web plug-in (a kind of TSM client software provided by a manager of the IC chip) for communicating to/from the external device through the intermediation of the browser is also stored in the storage unit 12 in advance.

As illustrated in FIG. 5, first, on the IC chip support terminal 10, the control unit 11 launches a common application stored in the storage unit 12 based on the user's operation detected by the operating unit 14 (Step S1). In this case, it is assumed that the common application has not been launched yet since the common application is downloaded. That is, the subsequent processes are executed when the common application is launched for the first time. In a case where the memory area for each of the IC-chip-based applications A and B has already been registered and have been subjected to the initial setting, the subsequent processes are not executed even when the common application is launched.

The control unit 11 uses the Web plug-in stored in the storage unit 12 to establish the communication to/from the service provider server 20. Between the IC chip support terminal 10 and the IC chip management server 30, a pre-registration process for the IC-chip-based application A is executed (Step S2), and then a pre-registration process for the IC-chip-based application B is subsequently executed (Step S3).

The pre-registration process is a process to be executed in advance in order to perform the registration process and the initial setting. When the pre-registration process is started, the control unit 11 generates execution status information for identifying the execution status of the processing. The execution status information is generated for each IC-chip-based application, and takes a value of any one of, for example, "before the registration of the memory area (registration process is incomplete)", "the registration of the memory area has been completed (registration process has been completed)", "before the initial setting (initial setting is incomplete)", and "the initial setting has been completed (initial setting has been completed)". The value of the execution status information is updated when the process described below is executed.

In the pre-registration process, the control unit 21 of the service provider server 20 may execute a process for generating data to be written at a time of the initial setting. For example, the control unit 21 generates ID information on the user for each IC-chip-based application, and transmits the ID information to the IC chip support terminal 10. In this case, the control unit 21 generates ID information for the IC-chip-based application A and ID information for the IC-chip-based application B. At this time point, the memory area for the IC-chip-based application has not been registered yet, and the IC chip support terminal 10 cannot write the ID information to the storage unit 16B in the IC chip 16, and therefore temporarily holds the received ID information in the storage unit 12.

The control unit 11 uses the Web plug-in stored in the storage unit 12 to establish the communication to/from the IC chip management server 30. Between the IC chip support terminal 10 and the IC chip management server 30, a registration process for the IC-chip-based application A is executed (Step S4), and then a registration process for the IC-chip-based application B is subsequently executed (Step S5). In the case of electronic money and points, the registration processes of Step S4 and Step S5 are each regarded as a ticket-issuance process, details of which are as described above. For example, the control unit 11 transmits the registration request for the IC-chip-based application A, and subsequently transmits the registration request for the IC-chip-based application B. Then, the IC chip management server 30 transmits a registration instruction for the IC-chip-based application A, and subsequently transmits a registration instruction for the IC-chip-based application B. In response to the received registration instructions, the IC chip support terminal 10 executes the registration process for the IC-chip-based application A and the registration process for the IC-chip-based application B. After the process of Step S5 is completed, a method for disconnecting the communication between the IC chip support terminal 10 and the IC chip management server 30 may be called, or the communication may be maintained until a timeout is reached.

Subsequently, between the IC chip support terminal 10 and the service provider server 20, an initial setting process for the IC-chip-based application A is executed (Step S6), and then an initial setting process for the IC-chip-based application B is subsequently executed (Step S7). Details of the initial setting processes are also as described above. In this case, the communication to/from the service provider server 20 is already established in Step S2, and hence the control unit 11 maintains the communication to transmit a request to start the initial setting to the service provider server 20. The service provider server 20 transmits the data to be written at the time of the initial setting, and the IC chip support terminal 10 executes, for example, the writing of the received data and the ID information issued in the pre-registration processes.

Subsequently, between the IC chip support terminal 10 and the service provider server 20, a post-registration process for the IC-chip-based application A is executed (Step S8), and then a post-registration process for the IC-chip-based application B is subsequently executed (Step S9), to thereby bring this processing to an end. In the post-registration process, for example, it is notified that the ID information, initial values, and other such information have been written, and the ID information temporarily stored in the storage unit 12 is deleted. The post-registration process may be omitted. After the process of Step S9 is completed, a method for disconnecting the communication between the IC chip support terminal 10 and the service provider server 20 may be called, or the communication may be maintained as it is until a timeout is reached.

According to the IC chip management system 1 described above, the registration process for the IC-chip-based application A and the registration process for the IC-chip-based application are executed successively or in parallel, the registration of the memory areas is completed in an earlier stage, and hence it is possible to enhance the reliability to enable the use of all the plurality of IC-chip-based applications. For example, even when, for example, the initial setting is stopped at some midpoint, the memory areas are secured earlier, and hence it is possible to prevent a remaining amount of memory in the IC chip 16 from becoming insufficient afterward due to another IC-chip-based application.

Further, the IC chip support terminal 10 can receive the registration instructions successively or at a time by transmitting the registration request to the IC chip management server 30 successively or at a time, to thereby be able to complete the registration of the memory areas in an earlier stage. As a result, it is possible to further enhance the reliability to enable the use of all the plurality of IC-chip-based applications.

Further, the communication is maintained after the IC chip support terminal 10 starts to transmit the registration request to the IC chip management server 30 until the IC chip support terminal 10 has finished receiving the registration instructions for all the IC-chip-based applications, to thereby eliminate the requirement to repeatedly establish and disconnect the communication. As a result, it is possible to alleviate processing loads on the IC chip support terminal 10 and the IC chip management server 30.

Further, the communication to/from the service provider server 20 is maintained after the IC chip support terminal 10 starts the process for the initial setting of the memory area until the initial setting has been finished, to thereby eliminate the requirement to repeatedly establish and disconnect the communication in order to complete the initial setting. As a result, it is possible to alleviate processing loads on the IC chip support terminal 10 and the service provider server 20.

2. Second Embodiment

In the first embodiment, the case in which the registration processes for the respective plurality of IC-chip-based applications are executed successively or in parallel is described, but even with such a configuration, the processes may be interrupted at some midpoint due to, for example, a communication failure before the initial setting is completed. In that case, the processes may be restarted from the interrupted process next time the common application is launched, for example. The overall configuration of the IC chip management system 1 is the same as that in the first embodiment, and in a second embodiment of the present invention described below, descriptions of the same portions as those in the first embodiment are omitted.

[2-1. Functional Blocks of Second Embodiment]

Figure 6:
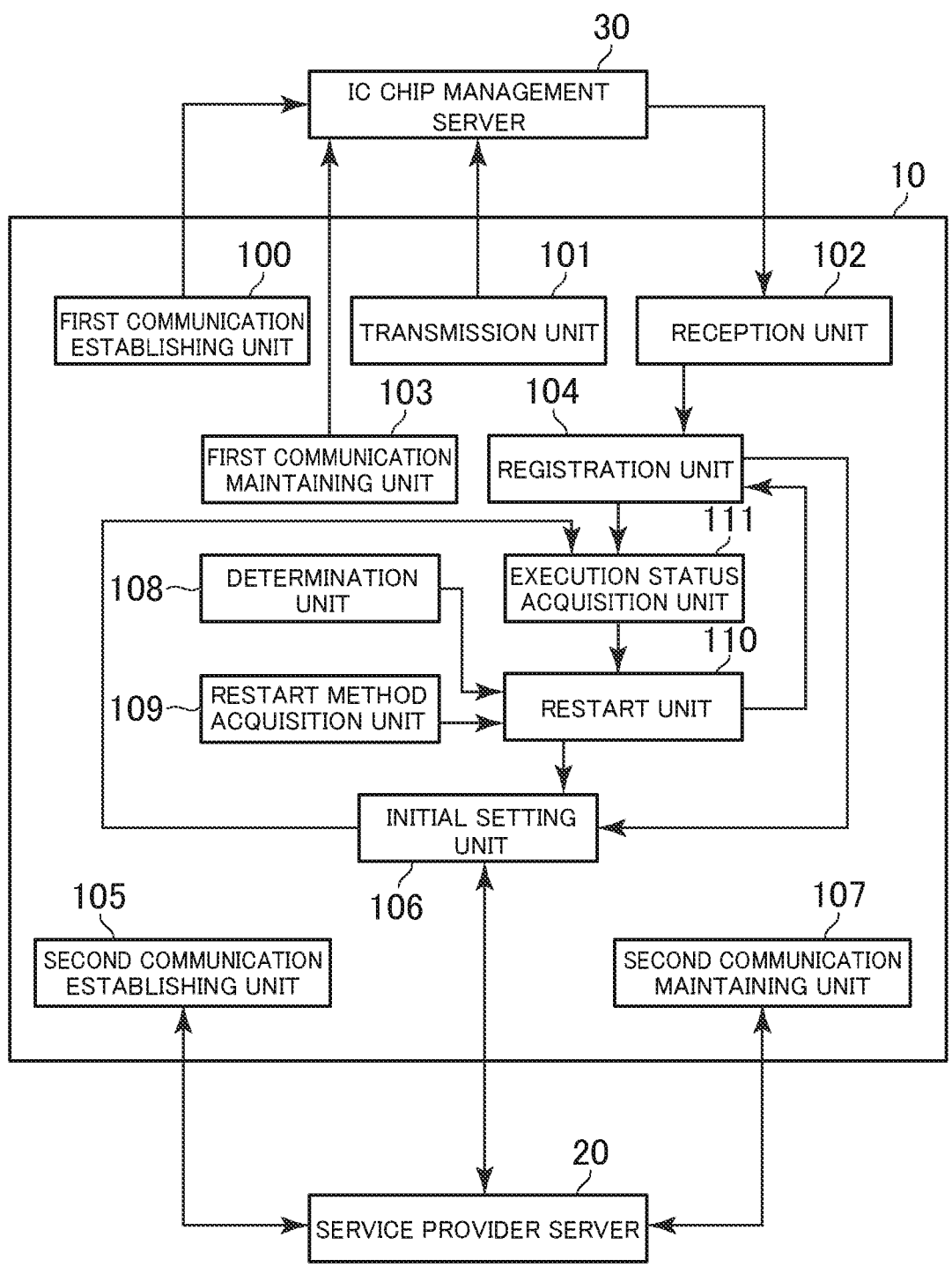
FIG. 6 is a functional block diagram in a second embodiment.

FIG. 6 is a functional block diagram in the second embodiment. As illustrated in FIG. 6, in the second embodiment, an execution status acquisition unit 108, a determination unit 109, a restart method acquisition unit 110, and a restart unit 111 are implemented in addition to the functions described in the first embodiment. Those respective functions are implemented mainly by the control unit 11.

The execution status acquisition unit 108 acquires the execution status of the processing of the registration unit 104 and the execution status of the processing of the initial setting unit 106. The execution status is a status of the processing, and may be information that can identify, for example, whether the processing is incomplete or has been completed. For example, the execution status acquisition unit 108 acquires the execution status information described in the first embodiment. A case in which the execution status information is stored in the storage unit 12 is described, but the execution status information may be stored in the storage unit 16B.

When the processing of the registration unit 104 has not been completed, the determination unit 109 determines whether or not it is possible to register the memory area that has not been registered based on the unused capacity of the IC chip 16. The unused capacity of the IC chip 16 may be acquired by transmitting a predetermined command to the IC chip 16, or information on the unused capacity may be stored in the storage unit 12 or the storage unit 16B. Information indicating which IC-chip-based application is using which block may also be stored in the storage unit 16B in the IC chip 16. In addition, a data size (for example, the number of blocks) required for each of the IC-chip-based applications may be included in the registration instruction, or may be defined in the common application.

For example, the determination unit 109 requests the IC chip 16 to acquire the unused capacity (for example, the number of unused blocks) of the storage unit 16B to determine whether or not there is an unused capacity equal to or larger than the data size (for example, the number of blocks) required for the IC-chip-based application for which a memory area has not been registered. When there is an unused capacity equal to or larger than a required data size, the determination unit 109 determines that it is possible to register the memory area, and when there is no unused capacity equal to or larger than the required data size, determines that it is impossible to register the memory area.

When the determination unit 109 determines that the registration is impossible, the restart method acquisition unit 110 acquires a restart method selected by the user. The user can select one from a plurality of restart methods, and those plurality of restart methods are presented to the user on a selection screen described later in such a manner as to allow the user to select one therefrom. The restart method refers to a method of determining which process the processing is to be restarted from.

When the processing of the registration unit 104 or the initial setting unit 106 has not been completed, the restart unit 111 causes the processing to be restarted based on the execution status acquired by the execution status acquisition unit 108. For example, the restart unit 111 may identify the process stopped at some midpoint based on the execution status indicated by the execution status information, and restart the processing from the identified process.

The restart method may be automatically determined, but, for example, the restart unit 111 may also cause the processing to be restarted based on a restart method selected by the user. In this case, the restart unit 111 restarts the processing based on the restart method selected by the user from among the plurality of restart methods. That is, the restart unit 111 causes the processing to be restarted from the process selected by the user.

In another case, for example, when the determination unit 109 determines that the registration is impossible, the restart unit 111 may also release the registered memory area while inhibiting the processing of the registration unit 104 from being restarted, and when the determination unit 109 determines that the registration is possible, cause the processing of the registration unit 104 to be restarted. The release of the memory area can also be regarded as deletion of the memory area, and refers to cancellation of association between the IC-chip-based application and the memory area. In other words, the release of the memory area refers to enabling the block in the memory area to be registered by another IC-chip-based application, and refers to returning the memory area to the state before the IC-chip-based application is registered.

For example, the release of the memory area may be executed only by the processing in the IC chip support terminal 10, but is assumed here to be executed between the IC chip support terminal 10 and the IC chip management server 30. For example, a procedure for the release of the memory area may be defined in the remote issuing data. In this case, when the restart unit 111 transmits a request to start a release process for the memory area to the IC chip management server 30, the IC chip management server 30 transmits, to the IC chip support terminal 10, a release instruction to execute the release process for the memory area based on the remote issuing data. The restart unit 111 executes deletion of the data in the user block of the memory area and deletion of the area and the service based on the received release instruction.

In addition, for example, when the processing of the initial setting unit 106 is not started, the restart unit 111 may restart the processing from the processing of the initial setting unit 106 after the processing of the registration unit 104 is completed. In this case, the memory area for each of the IC-chip-based applications has been registered, and hence the restart unit 111 may restart the processing from the initial setting of the registered memory area.

In addition, for example, when the processing of the initial setting unit 106 is stopped at some midpoint, the restart unit 111 may restart the processing from the processing of the initial setting unit 106. In this case, the initial setting of a partial memory area has not been completed yet, and hence the restart unit 111 may restore the processing from the initial setting of the partial memory area.

[2-2. Processing Executed in Second Embodiment]

FIG. 7 to FIG. 10 are flow charts for illustrating examples of processing executed in the second embodiment. As illustrated in FIG. 7 to FIG. 10, the processing executed in the second embodiment is different from the processing described in the first embodiment in that it is determined how far the processing has been advanced when the common application is launched, and the subsequent processes are executed based on a result of the determination.

Figure 7:
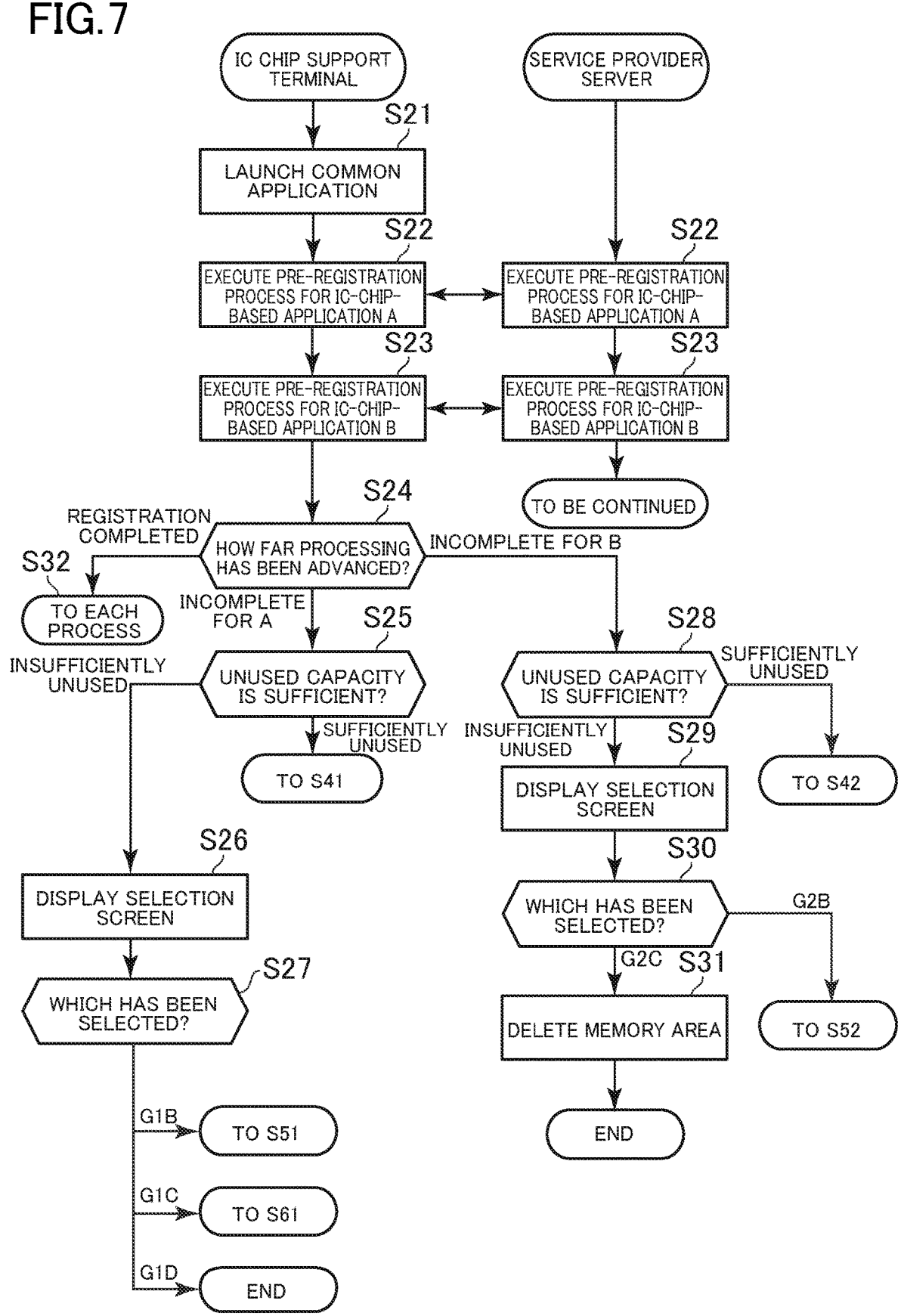
FIG. 7 is a flow chart for illustrating an example of processing executed in the second embodiment.

First, as illustrated in FIG. 7, Step S21 to Step S23 are the same as Step S1 to Step S3, respectively. In the same manner as in the first embodiment, it is assumed that, when the memory area corresponding to each of the IC-chip-based applications A and B has already been registered and the processing up to the initial setting has been completed, Step S22 and the subsequent processes are not executed after the common application is launched in Step S21.

When pre-ticket-issuance processes of Step S22 and Step S23 are performed to acquire the execution status information, the control unit 11 determines how far the processing has been advanced based on the execution status information (Step S24). When the common application is launched for the first time, the execution status information indicates that the registration process for the IC-chip-based application A has not been completed. When the processing was stopped at some midpoint at a time of the previous launch, the execution status information indicates that the process stopped at some midpoint has not been completed.

When determining in Step S24 that the registration process for the IC-chip-based application A has not been completed (Step S24; incomplete for A), the control unit 11 determines whether or not the unused capacity of the IC chip 16 is left sufficiently (Step S25). In Step S25, the control unit 11 acquires the unused capacity of the IC chip 16 to determine whether or not blocks, the number of which is equal to or larger than a total value of the number of blocks required for the IC-chip-based application A and the number of blocks required for the IC-chip-based application B, are unused.

Figure 8:
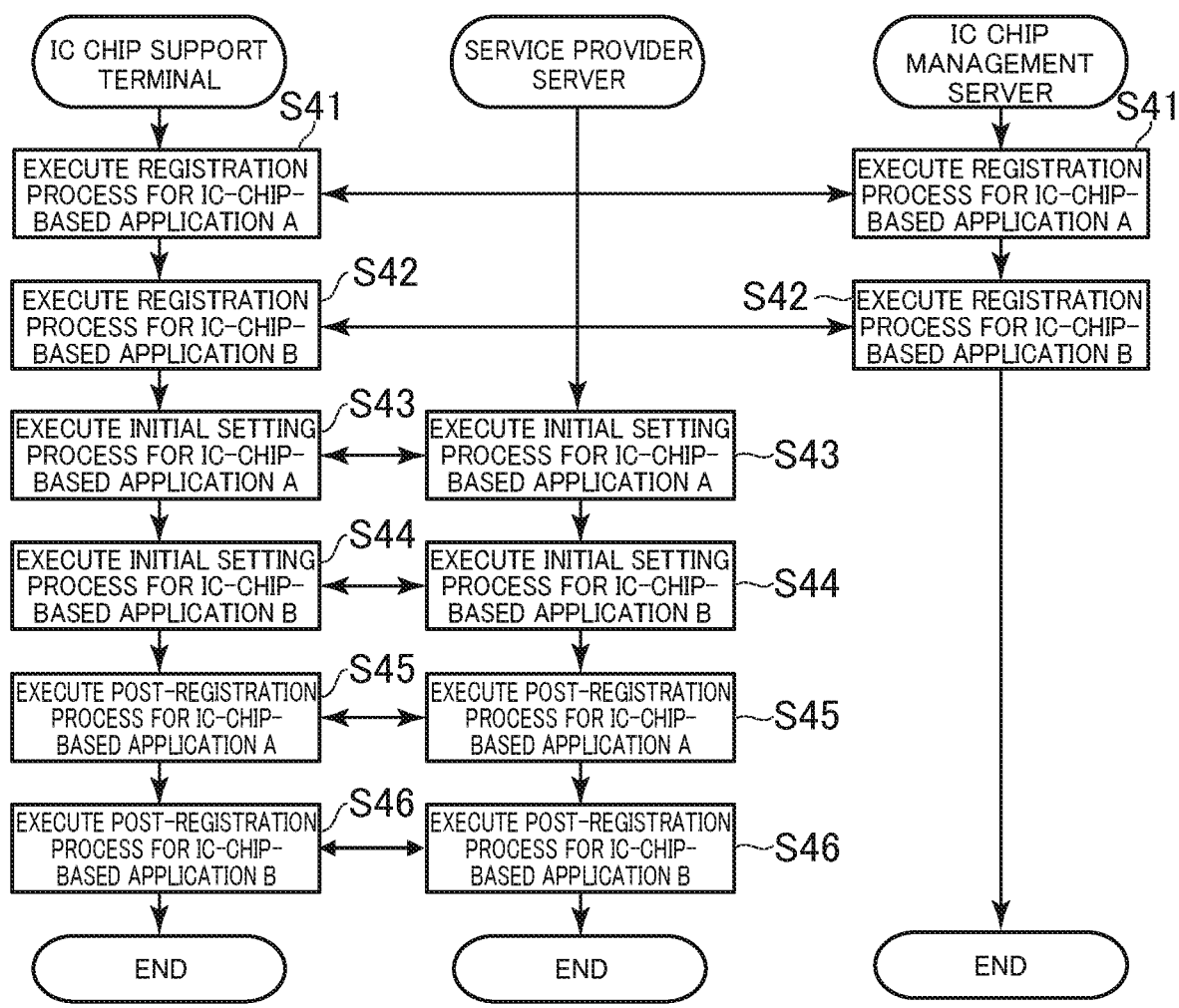
FIG. 8 is a flow chart for illustrating an example of processing executed in the second embodiment.
Figure 9:
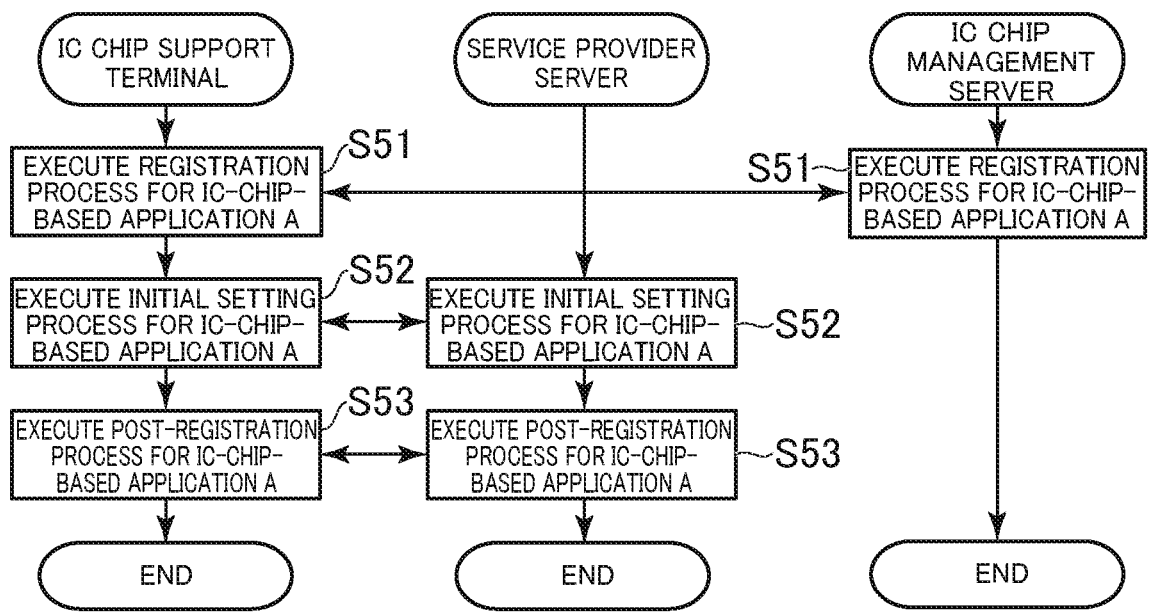
FIG. 9 is a flow chart for illustrating an example of processing executed in the second embodiment.
Figure 10:
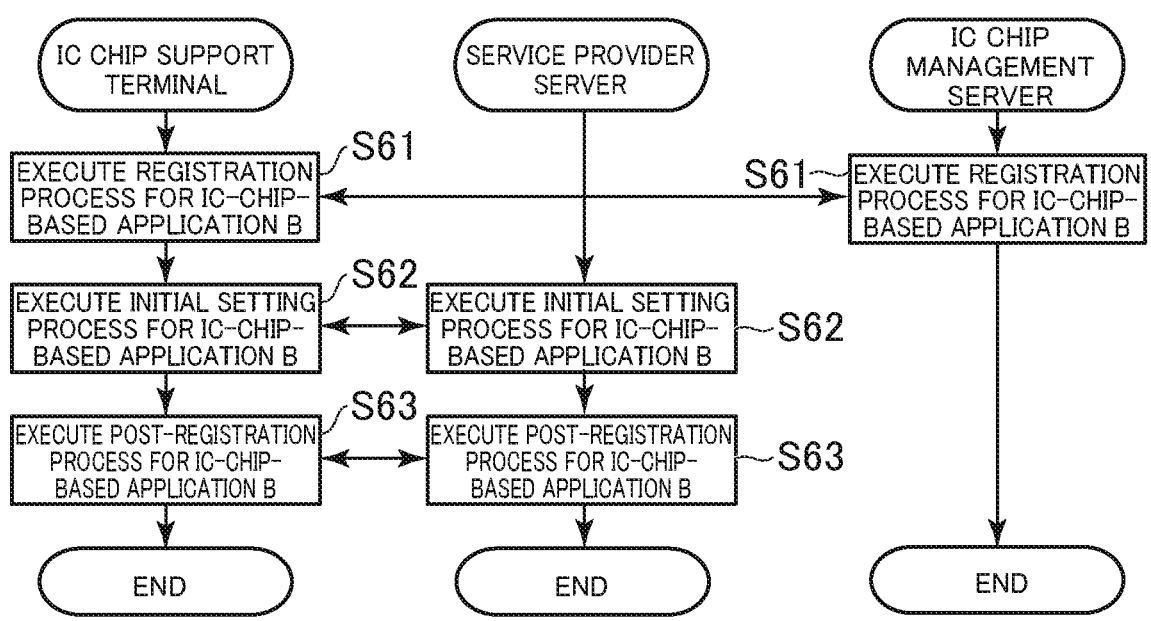
FIG. 10 is a flow chart for illustrating an example of processing executed in the second embodiment.

When it is determined that the unused capacity is left sufficiently (Step S25; sufficiently unused), the processing advances to the process of Step S41 in FIG. 8 to be restarted from the registration process for the IC-chip-based application A. As illustrated in FIG. 8, the processes of Step S41 to Step S46 are the same as the processes of Step S4 to Step S9, respectively. The processes of Step S41 to Step S46 are executed, to thereby restart the registration processes and the initial setting for the IC-chip-based applications A and B.

Meanwhile, when determining in Step S25 that the unused capacity is left insufficiently (Step S25; insufficiently unused), the control unit 11 causes the display unit 15 to display a selection screen for allowing the user to select the restart method (Step S26).

Figure 11:
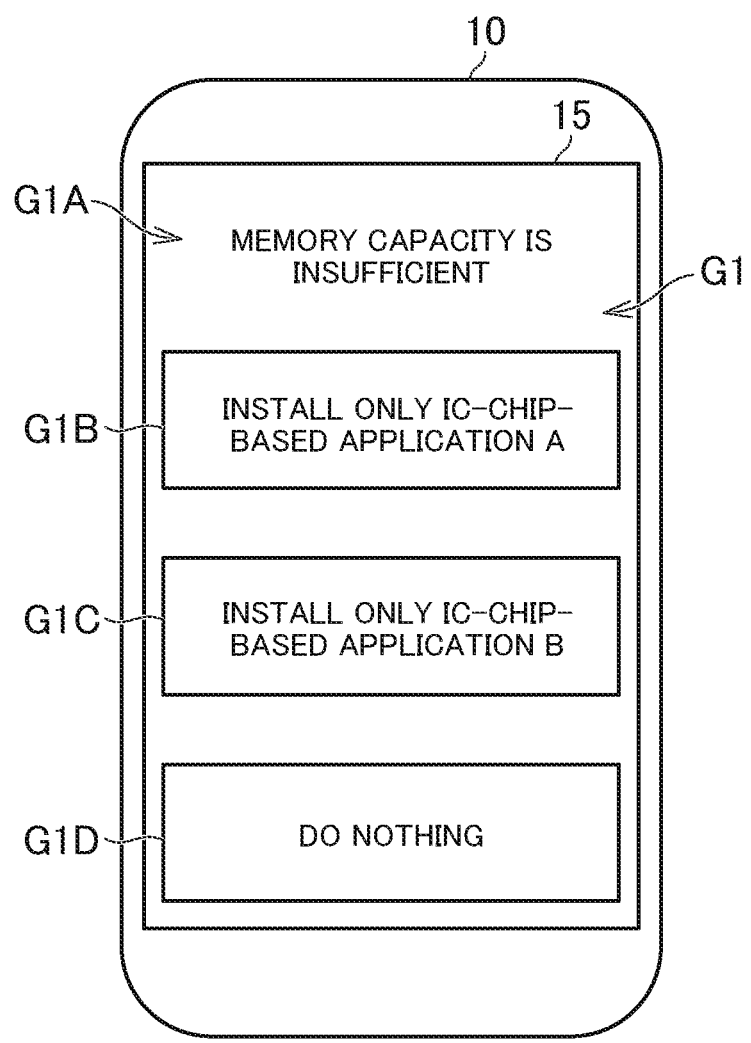
FIG. 11 is a diagram for illustrating an example of a selection screen to be displayed in Step S26.

FIG. 11 is a diagram for illustrating an example of a selection screen to be displayed in Step S26. As illustrated in FIG. 8, on a selection screen G1, a message G1A indicating that the unused capacity of the IC chip 16 is small is displayed, and buttons G1B to G1D corresponding to a plurality of restart methods are displayed. The button G1B is a button for registering only the IC-chip-based application A. The button G1C is a button for registering only the IC-chip-based application B. The button G1D is a button for ending the selection screen G1 without performing any operation. When even the remaining amount of memory enough to register only the IC-chip-based application A is not left, the button G1B is not required to be displayed. In the same manner, when even the remaining amount of memory enough to register only the IC-chip-based application B is not left, the button G1C is not required to be displayed.

The control unit 11 determines which button has been selected by the user based on a detection signal from the operating unit 14 (Step S27). When it is determined that the user has selected the button G1B (Step S27; G1B), the processing advances to the process of Step S51 in FIG. 9. The processes of Step S51 to Step S53 are the same as those of Step S4, Step S6, and Step S8, respectively. The processes of Step S51 to Step S53 are executed, to thereby restart only the registration process and the initial setting for the IC-chip-based application A without restarting the registration process and the initial setting for the IC-chip-based application B.

Meanwhile, when it is determined in Step S27 that the user has selected the button G1C (Step S27; G1C), the processing advances to the process of Step S61 in FIG. 10. The processes of Step S61 to Step S63 are the same as those of Step S5, Step S7, and Step S9, respectively. The processes of Step S61 to Step S63 are executed, to thereby restart only the registration process and the initial setting for the IC-chip-based application B without restarting the registration process and the initial setting for the IC-chip-based application A.

When it is determined in Step S27 that the user has selected the button G1D (Step S27; G1D), this processing is brought to an end. In this case, the state in the storage unit 16B of the IC chip 16 is not changed as it is. That is, in this case, the use of neither one of the IC-chip-based applications A and B is enabled.

Meanwhile, when determining in Step S24 that the registration process for the memory area for the IC-chip-based application A has been completed but the registration process for the memory area for the IC-chip-based application B has not been completed (Step S24; incomplete for B), the control unit 11 determines whether or not the unused capacity of the IC chip 16 is left sufficiently (Step S28). In Step S28, the control unit 11 acquires the unused capacity of the IC chip 16 to determine whether or not blocks, the number of which is equal to or larger than the number of blocks required for the IC-chip-based application B, are unused.

When it is determined that the unused capacity is left sufficiently (Step S28; sufficiently unused), the processing advances to the process of Step S42 in FIG. 8. In this case, the processing is restarted from the registration process for the IC-chip-based application B.

Meanwhile, when determining in Step S28 that the unused capacity is left insufficiently (Step S28; insufficiently unused), the control unit 11 causes the display unit 15 to display a selection screen for allowing the user to select a restart method (Step S29).

Figure 12:
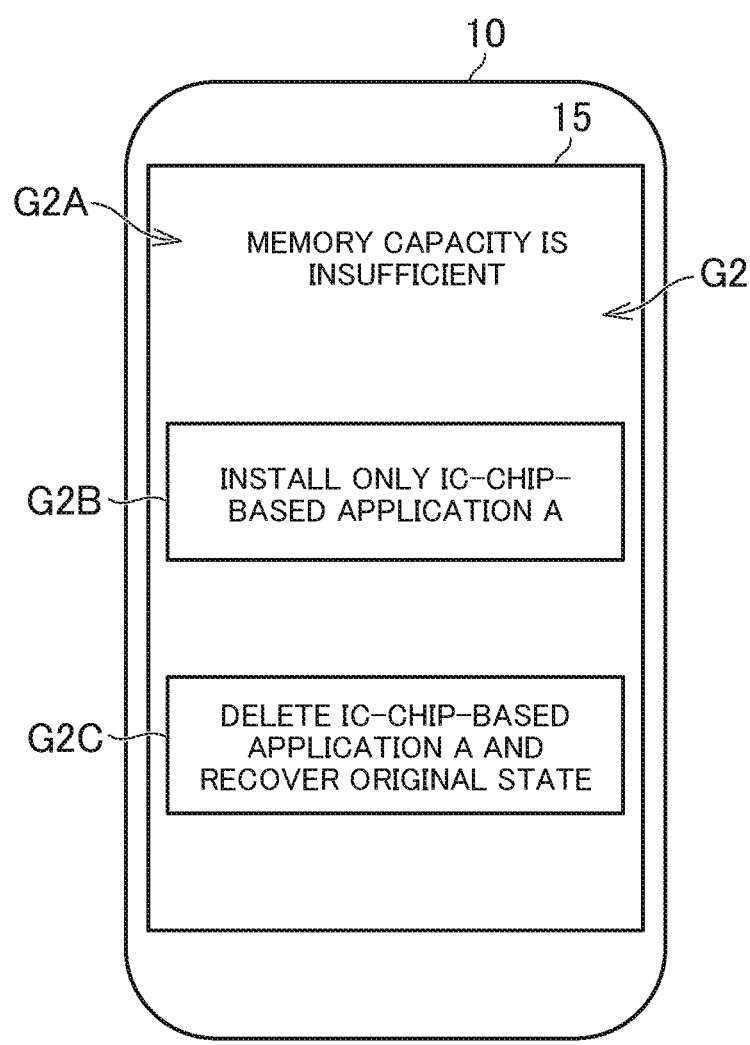
FIG. 12 is a diagram for illustrating an example of a selection screen to be displayed in Step S29.

FIG. 12 is a diagram for illustrating an example of a selection screen to be displayed in Step S29. As illustrated in FIG. 12, on a selection screen G2, a message G2A indicating that the unused capacity of the IC chip 16 is small is displayed, and buttons G2B to G2C corresponding to the respective plurality of restart methods are displayed. The button G2B is a button for registering only the IC-chip-based application A. The button G2C is a button for deleting the IC-chip-based application A. In this manner, the selection screen G2 may differ from the selection screen G1. That is, the restart method selectable by the user may differ depending on the execution status of the processing.

The control unit 11 determines which button has been selected by the user based on a detection signal from the operating unit 14 (Step S30). When it is determined that the user has selected the button G2B (Step S30; G2B), the processing advances to the process of Step S52 in FIG. 9. In this case, the initial setting process for the IC-chip-based application A is restarted, and the registration process and the initial setting for the IC-chip-based application B are not restarted.

Meanwhile, when determining in Step S30 that the user has selected the button G2C (Step S27; G2C), the control unit 11 deletes the memory area for the IC-chip-based application A (Step S31), to thereby bring this processing to an end. In Step S31, the control unit 11 transmits a request for the release of the memory area to the IC chip management server 30, and releases the memory area for the IC-chip-based application A based on the procedure defined in the remote issuing data stored in the IC chip management server 30. In this case, the memory area is not registered for any one of the IC-chip-based applications A and B.

When determining in Step S24 that the registration processes for both the memory areas for the IC-chip-based applications A and B have been completed (Step S24; registration completed), the control unit 11 restarts the processing from the process stopped at some midpoint (Step S32). For example, when the initial setting for the IC-chip-based application A is incomplete (for example, when the initial setting has not been started for any one of the IC-chip-based applications A and B), the processing advances to the process of Step S43 to be restarted from the initial setting for the IC-chip-based application A. Meanwhile, for example, when the initial setting for the IC-chip-based application B is incomplete, the processing advances to the process of Step S44 to be restarted from the initial setting for the IC-chip-based application B. The execution status information may include information indicating whether or not the post-registration process has been completed, and the processing may advance to the process of Step S45 when the post-registration process for the IC-chip-based application A has not been completed, and advance to the process of Step S46 when the post-registration process for the IC-chip-based application B has not been completed.

According to the IC chip management system 1 in the second embodiment, even when the registration process or the initial setting is stopped at some point, the processing can be restarted from the stopped point, and hence it is possible to further enhance the reliability to enable the use of all the plurality of IC-chip-based applications.

Further, when the remaining amount of memory in the IC chip 16 is small and the registration process for a part of the IC-chip-based applications is impossible, it is possible to restart the processing based on the restart method selected by the user. For example, the user is allowed to select the restart method from the selection screens G1 and G2, to thereby be able to allow the user to select the IC-chip-based application required for the user and register the selected IC-chip-based application.

Further, when the remaining amount of memory in the IC chip 16 is small and the registration process for a part of the IC-chip-based applications is impossible, it is possible to release the registered memory area. For example, when the use of both the IC-chip-based applications A and B is required to be enabled for the user, it is possible to release the memory area for a part of the IC-chip-based applications registered at the current time point and allow another IC-chip-based application to use the memory area, to thereby be able to achieve effective use of the memory area.

Further, when the initial setting is not started after the registration processes for all the IC-chip-based applications have been completed, the memory area has already been secured, and hence the processing is restarted from the remaining initial setting, to thereby be able to enable the use of all the plurality of IC-chip-based applications.

Further, even when the initial setting for a part of the IC-chip-based applications has not been completed, the memory area has already been secured, and hence the processing is restarted from the remaining initial setting, to thereby be able to enable the use of all the plurality of IC-chip-based applications.

5. Modification Examples

The present invention is not limited to the embodiments described above, and can be modified suitably without departing from the spirit of the present invention.

For example, the initial setting may be executed between the IC chip support terminal 10 and the IC chip management server 30 instead of being executed between the IC chip support terminal 10 and the service provider server 20. In this case, a processing procedure for the initial setting may be defined in the remote issuing data.

Further, for example, the data to be written to the memory area for the IC-chip-based application may include a command and a program dedicated to the IC-chip-based application. Further, for example, the case in which the procedure for the registration process is defined in the remote issuing data has been described, but the procedure for the registration process may be defined in data other than the remote issuing data. For example, the procedure for the registration process may be defined in the common application or another program. Further, for example, the case in which the number of required blocks is included in the registration instruction has been described, but information indicating which block is to be allocated to a given IC-chip-based application may be included in the registration instruction. Further, which block is to be allocated to the IC-chip-based application may be defined in advance for each of the IC-chip-based applications, or may be determined under a predetermined condition.

Further, for example, when a plurality of IC-chip-based applications are not combined into a common application, information for identifying which of the IC-chip-based applications are to be allowed to be used simultaneously may be stored in the storage unit 12. The registration processes for the plurality of IC-chip-based applications identified by this information may be executed successively or in parallel. Further, for example, the first and second embodiments have been described by taking the case of registering the memory areas for two IC-chip-based applications, but the processing described above can also be applied to a case of registering memory areas for three or more IC-chip-based applications. Further, for example, the computers included in the IC chip management system 1 are not limited to the example illustrated in FIG. 1. For example, when the IC chip management server 30 manages the distribution and the initial setting of the memory area of the IC-chip-based application as well, the service provider server 20 may be omitted.

The invention claimed is:

1. An IC chip support terminal, comprising at least one processor configured to:
    transmit, to an IC chip management server, a registration request for each of a plurality of memory areas respectively corresponding to a plurality of IC-chip-based applications for using an IC chip;
    receive registration instructions for the respective memory areas, each of which is transmitted by the IC chip management server in response to the registration request;
    execute processes for registering the respective memory areas in the IC chip successively or in parallel based on the registration instructions;
    perform an initial setting on each of the registered memory areas when all the plurality of memory areas have been registered in the IC chip;
    acquire an execution status of processing of the registration and an execution status of processing of the initial setting; and
    cause the processes for registering the respective memory areas in the IC chip or the initial setting to be restarted based on the acquired execution status when the processes for registering the respective memory areas in the IC chip or the initial setting has not been completed.

2. The IC chip support terminal according to claim 1, wherein the at least one processor:
    transmits the registration requests for the respective memory areas to the IC chip management server successively or at a time,
    receives the registration instructions for the respective memory areas successively or at a time, the registration instructions being transmitted from the IC chip management server successively or at a time, and
    executes processes for registering the respective memory areas in the IC chip successively or in parallel based on the registration instructions received successively or at a time.

3. The IC chip support terminal according to claim 1, wherein the at least one processor:
    establishes communication to/from the IC chip management server; and
    maintains established communication after starting to transmit the registration request for any one of the memory areas until having finished receiving the registration instructions for all the plurality of memory areas.

4. The IC chip support terminal according to claim 1, wherein the at least one processor:
    performs the initial setting based on a content of communication to/from the management server or a common server common to the respective IC-chip-based applications,
    establishes communication to/from the common server or the management server; and
    maintains established communication after a process for the initial setting for any one of the IC-chip-based applications is started until the initial setting for all the plurality of IC-chip-based applications has been finished.

5. The IC chip support terminal according to claim 1, wherein the at least one processor:
   determines, when the processing of the registration has not been completed, whether registration of a memory area that is yet to be registered is possible based on an unused capacity of the IC chip;
   acquires a restart method selected by a user when it is determined that the registration is impossible,
   causes the processing to be restarted based on the restart method selected by the user.

6. The IC chip support terminal according to claim 1, wherein the at least one processor:
   determines, when the processing has not been completed, whether the registration of the memory area that is yet to be registered is possible based on the unused capacity of the IC chip,
   releases a registered memory area without restarting the processing when it is determined that the registration is impossible; and
   causes the processing to be restarted when it is determined that the registration is possible.

7. The IC chip support terminal according to claim 1, wherein the at least one processor causes the processing to be restarted from processing of the initial setting when the processing of the initial setting is not started after the processing of the registration has been completed.

8. The IC chip support terminal according to claim 1, wherein the at least one processor causes the processing to be restarted from processing of the initial setting that is stopped at some midpoint when the processing of the initial setting is stopped at some midpoint.

9. An IC chip setting method, comprising:
   transmitting, to an IC chip management server, a registration request for each of a plurality of memory areas respectively corresponding to a plurality of IC-chip-based applications for using an IC chip;
   receiving registration instructions for the respective memory areas, each of which is transmitted by the IC chip management server in response to the registration request;
   executing processes for registering the respective memory areas in the IC chip successively or in parallel based on the registration instructions;
   performing an initial setting on each of the registered memory areas when all the plurality of memory areas have been registered in the IC chip;
   acquiring an execution status of processing of the registration and an execution status of processing of the initial setting; and
   causing processes for registering the respective memory areas in the IC chip or the initial setting to be restarted based on the acquired execution status when the processes for registering the respective memory areas in the IC chip or the initial setting has not been completed.

10. A non-transitory computer-readable information storage medium for storing a program for causing a computer to:
   transmit, to an IC chip management server, a registration request for each of a plurality of memory areas respectively corresponding to a plurality of IC-chip-based applications for using an IC chip;
   receive registration instructions for the respective memory areas, each of which is transmitted by the IC chip management server in response to the registration request;
   execute processes for registering the respective memory areas in the IC chip successively or in parallel based on the registration instructions;
   perform an initial setting on each of the registered memory areas when all the plurality of memory areas have been registered in the IC chip;
   acquire an execution status of processing of the registration and an execution status of processing of the initial setting; and
   cause the processes for registering the respective memory areas in the IC chip or the initial setting to be restarted based on the acquired execution status when the processes for registering the respective memory areas in the IC chip or the initial setting has not been completed.

* * * * *